UNITED STATES PATENT OFFICE.

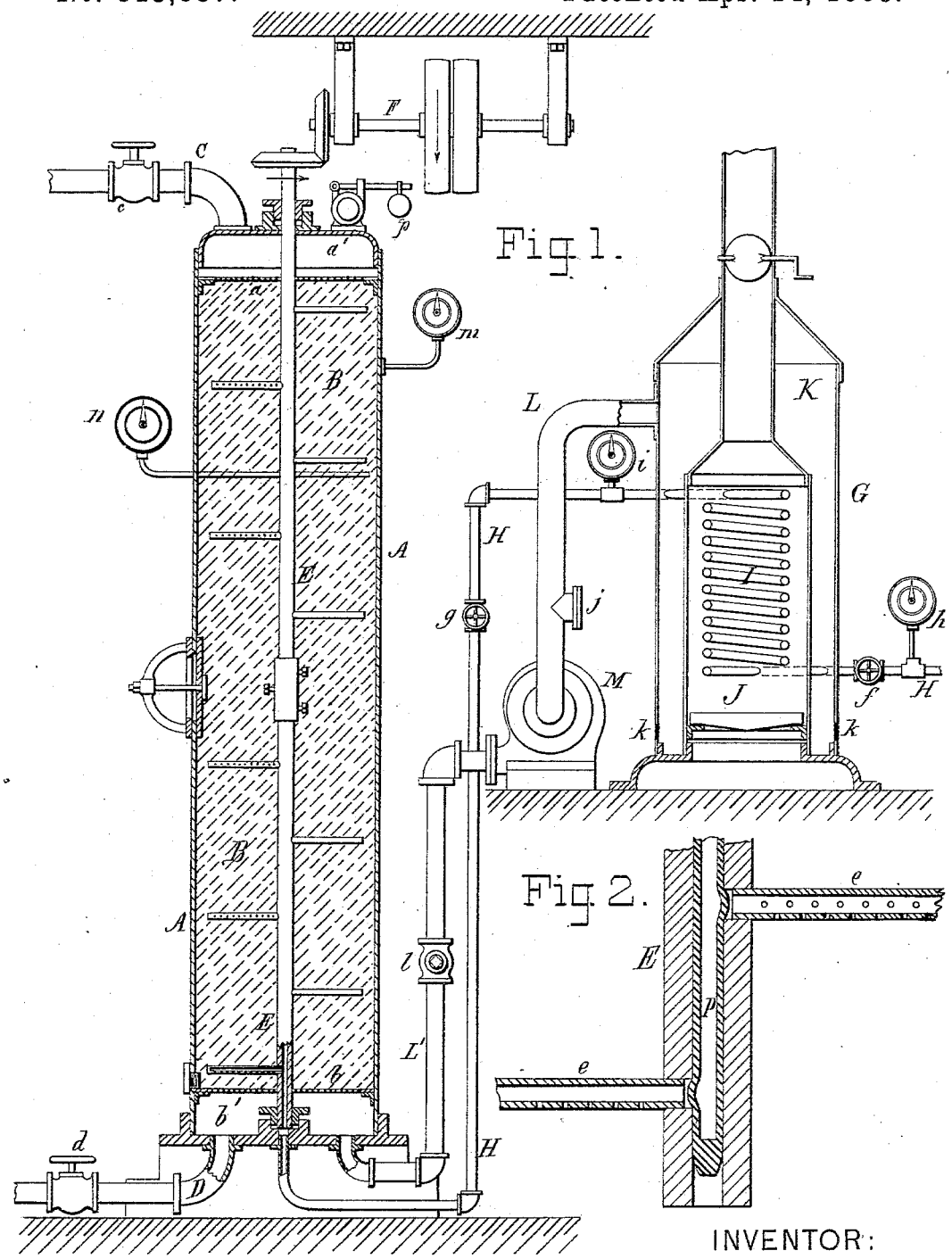

JOSEPH WM. J. REFORD, OF JERSEY CITY, NEW JERSEY, ASSIGNOR TO WILLIAM WATT, OF BROOKLYN, NEW YORK.

REVIVIFYING FILTERING MATERIAL.

SPECIFICATION forming part of Letters Patent No. 315,837, dated April 14, 1885.

Application filed October 15, 1881. Renewed August 12, 1882. (No model.)

*To all whom it may concern:*

Be it known that I, JOSEPH WM. J. REFORD, a citizen of the United States, residing in Jersey City, in the county of Hudson and State of New Jersey, have invented an Improved Process of and Apparatus for Revivifying or Carbonizing Filtering Material, of which the following is a specification.

The object of this invention is to provide a means for thoroughly revivifying spent or worthless filtering or clarifying material without necessarily removing it from the filtering-vessel, and without the use of chemicals.

Heretofore in using filters such as those containing bone-black for filtering or clarifying saccharine sirups and other liquids, when the bone-black or other absorbent becomes clogged with the extracted impurities, it has been customary to remove it from the filtering-vessel, place it in a sealed retort and carbonize it by the heat of a furnace, a method involving considerable expense and loss of time, and by which the filtering material is but partially purified. The retort being sealed, the gases driven off by the heat form deleterious compounds with the iron of the retorts and are again absorbed by the bone-black or other material, rendering the latter impure and detracting from its effectiveness as a purifying absorbent. Attempts have been made from time to time to improve upon this method; but their success has been only partial. Among them may be mentioned forcing superheated steam through the bone-black or other material while it is in the filtering-vessel, and then treating it with a solution of carbonate of ammonia; also, according to another process, forcing superheated air or steam, singly or combined, through the oven or retort in which the material is undergoing carbonization by external heat, by which means it was claimed that the carbonization could be effected at a black heat instead of at a red heat. The latter method is objectionable on account of the heating of the retort or oven, and both are wanting in thoroughness and uniformity, because of no means being provided to insure the uniform permeation of the steam through all portions of the material, and for keeping the latter in a granulated and comminuted condition.

By my process I proceed as follows: The admission to the filter of sirup or other substances to be filtered is stopped. A jet of live or prime steam is then introduced into the latter, preferably at the bottom thereof, and it permeates the mass of filtering material, being in part condensed therein and in part passing through the same, dissolving and carrying off the soluble impurities contained therein, and more or less of it escaping from the vessel. When the mass is thoroughly saturated with the condensed steam, the supply of steam is stopped and the mass is left to digest for a longer or shorter time—say for about four hours—its temperature being kept up to a uniform degree by any suitable means of heating, preferably by introducing a small quantity of live steam from time to time. When the digesting process is completed, the mass of material is then thoroughly dried by any suitable means, preferably by forcing through it a current of hot air, which vaporizes the moisture and conveys it from the vessel. After the air-blast is suspended a current of superheated steam is passed through the mass, the steam having been heated to a high degree, the temperature depending on the nature of the material under treatment. The superheated steam drives off the volatile impurities contained in the filtering material and carbonizes or revivifies the material. During the injection the material is continually stirred by suitable means, whereby the particles are prevented from adhering to each other and forming lumps or cakes, and the steam is caused to uniformly permeate the entire mass of material. Were it not for this stirring the steam would seek the easiest passage through the mass, forming, to some extent, a channel for itself, while the portions of the material not adjacent to that channel would not be permeated by the steam to the necessary extent, and would form in cakes or lumps. The result would be an unequal or but partial revivification, which would deprive the material of its uniform granulation. In practice, I prefer to arrange a revolving shaft in the vessel with radial stirring-arms moving through the material, and to inject the superheated steam through numerous perforations in these arms, by which means the steam is introduced into all parts of the mass simultaneously with the stirring. When the desired revivification is fully accomplished, which will take a longer or shorter time, depending on the nature and amount of the filtering material and the volume and temperature of the steam used, the supply of steam is cut off, and the mass of material is cooled in any suitable way, preferably by passing a forcible current of cold air through it, as air at the ordinary atmospheric temperature. When properly cooled, the use of the filter may be immediately resumed.

My process saves the expense and delay incident to the removal of the filtering material from the filtering-vessel to a retort, and it also more thoroughly and uniformly purifies the material than by any method heretofore practiced. In the case of bone-black my process renders the revivified bone-black in all respects as effective as new or unused boneblack.

In my Patent No. 159,451, dated February 2, 1875, I have described a process of purifying filtering material without removing it from the filter, by driving out the remaining filtrate by the use of live steam, introducing certain chemicals to take up certain of the impurities held in the filtering material, driving off these chemicals by the further injection of live steam, and then injecting superheated steam to recarbonize the filtering material without stirring. In my present process I employ no chemicals whatever, and I add greatly to the thoroughness and expedition of the treatment by thoroughly washing the material by passing live steam through it for a considerable time and then drying it previous to the carbonizing operation, and by actively stirring the material during the treatment with superheated steam, thereby causing the steam to reach all particles thoroughly and equally. By forcing hot air through the material previous to carbonizing with the superheated steam the material is thoroughly dried so that the steam can at once act to carbonize it without first having to dry it, as heretofore. When superheated steam is injected with moist material, much of it is condensed therein until the material is raised to a high temperature, and even then the drying is less rapid than when hot air is used, which is more absorbent of moisture and cannot condense. I may here remark that my said patented process was designed especially for filters used for alcoholic liquors, while my present invention relates most particularly to saccharine-filters.

In the accompanying drawings is shown the apparatus which I have designed to carry out my present process.

Figure 1 is a side elevation of the apparatus, partially in vertical mid-section; and Fig. 2 is a fragmentary detail view.

A is the filtering vessel or cylinder containing any suitable filtering or clarifying materials, B, confined between two foraminous partitions, an upper one, $a$, and a lower one, $b$.

C is the pipe admitting the saccharine-sirup or other liquid to be filtered or clarified to the space $a'$ above the partition $a$, this pipe being fitted with a stop-cock, $c$.

D is a similar pipe conveying the filtrate from the space $b'$ below the partition $b$, it being fitted by a cock, $d$. The filter thus far described is of the usual construction, the precise construction not being essential to my invention. I lift it with a hollow or tubular shaft, E, which, with the cylinder A, I have shown as arranged vertically—the preferable arrangement. The bottom end of this shaft is stepped in a socket in the lower head of the cylinder A, and its upper portion passes through a stuffing-box in the upper head of the cylinder and terminates above the top of the cylinder, its upper end being fitted with a gear-wheel meshing with another gear on a counter-shaft, F, or otherwise provided with means for revolving it. The shaft E is provided within the cylinder A with several radial tubular arms, $e\ e$, whose bores communicate with the bore in the shaft, and which are provided with perforations, preferably along the front and bottom side of each arm.

G is a superheater, and H is a steam-pipe coming from an ordinary steam-boiler. (Not shown.) The pipe H passes in the form of a coil or worm, I, through the superheater G, and terminates at the cylinder A, underneath the shaft E, where its bore communicates with that of the shaft. It is provided with a stop-cock, $f$, between the boiler and superheater, with a stop-cock, $g$, between the superheater and the cylinder A, with a pressure-gage, $h$, between the cock $f$ and the boiler, and with another pressure-gage, $i$, between the superheater and the cock $g$.

The superheater G consists, by preference, of a furnace, J, in which the worm I is arranged, and which terminates in the usual smoke-stack. Around the furnace and smokestack is a hot-air jacket, K, having openings $k\ k$ at the bottom for admitting air, and tapped near its top by an exhaust-pipe, L, leading to a rotary fan or other suitable blower, M, whence a pipe, L', leads to the space $b'$ in the cylinder A. The pipe L is provided with a cap, $j$, or a valve or other device by which a short cut opening to the outer air may be secured, and the pipe L' is fitted with a cock or valve $l$.

The cylinder A is provided with a pressure-gage, $m$, with a pyrometer, $n$, and with a safety-valve, $p$, the two former being preferably arranged between the two partitions $a$ and $b$, and the latter at the top of the cylinder and communicating with the space $a'$.

In the ordinary use of the filter the shaft E is stationary, there is no fire in the furnace J, the cocks $g$ and $l$ are closed, the cocks $c$ and $d$ are open, and a stream of liquid is flowing through the pipe C down through the filter and out through the pipe D. In order to prevent a portion of the liquid under treatment passing through the perforations in the upper arms *e e* descending through the shaft E and passing out through the lower arms *e e*, thereby escaping filtration, I plug up the shaft E by inserting at its upper end a rubber tube of slightly less diameter than the bore of the shaft, dropping this tube until its lower end, which is closed, is below the bottom arm *e* and then pumping air into the rubber tube so as to expand it within the shaft E and close the openings into said shaft by the arms *e e*. In Fig. 2 the shaft E, the arms *e e*, and this rubber tube, lettered P, are shown on an enlarged scale in vertical mid-section.

When the filtering material needs revivifying, the cocks *c* and *d* are closed, the tube P collapsed and withdrawn, and the upper end of the shaft E plugged up. The shaft E is then revolved in the direction of the arrow, the cocks *f* and *g* are opened, and live steam enters through the pipe H, passes up through the shaft E into the arms *e e*, and out through the perforations therein into the mass of material B, which is being continually stirred by the revolving arms. The portion of steam which passes through the material escapes at the safety-valve *p*, carrying with it various impurities in suspension. When the mass is thoroughly saturated one cock, *f* or *g*, is closed and the mass is left to digest for some time, its temperature, as shown by the pyrometer *n*, being kept up by opening the steam-cocks from time to time. During the digesting operation a fire is built in the furnace J, and when that operation is completed the cock *g* is closed, the blower M set in motion, and the cock *l* opened, whereupon air enters the jacket K at the holes *k k*, is heated in the jacket, is drawn through the pipe L to the blower and is thence forced through the pipe L' to the cylinder A, in which the hot air passes up through the mass of material B and escapes at the valve *p*. When the material is quite dry, the cock *l* is closed, the blower is stopped, and the cocks *f* and *g* are opened, whereupon the steam from the boiler in passing through the worm I becomes superheated and the superheated steam is conducted through the revolving shaft E and injected from its arms *e e* into the mass of material B, through which it passes and escapes at the valve *p*. By the continual agitation of the material by the stirring-arms, and the admission of steam through the arms the penetration of the steam to every portion of the mass is insured, and the thorough granulation of the material is maintained. This steam-injection is continued until the material is fully recarbonized, when the cock *g* is closed, the blower M is again started, and the cap or valve *j* and the cock *l* are opened, whereupon the blower draws in cold air at *j* and forces it through the material B until it is sufficiently cooled, whereupon the blower is stopped, the cock *l* closed, the rubber tube P again inserted into the shaft E, the cocks *c* and *d* opened, and the filtering process is resumed. Instead of revivifying the filtering material in the filtering-vessel, the revivifying apparatus may be distinct therefrom, being provided with a cylinder, A, of its own, and the material may be removed from the filtering-vessel to this cylinder when it is to be revivified, and afterward returned to the vessel. This, although considerably more expensive than my first-described process, will be much less expensive than the retort process, and it will also have a decided advantage thereover in the more complete revivification and purification of the material. In fact it is of advantage to subject new bone-black to my process before using it all, since by it the deleterious animal matters found therein may be driven off.

My apparatus may also be used for carbonizing substances to fit them for use as filtering or clarifying materials.

Several filters may be connected with the same boiler, superheater, and blower, and the pipes H and L' being branched to connect with the several cylinders A.

I do not limit myself to the use of the apparatus shown in carrying out my process; nor do I limit my apparatus to the precise construction shown.

I claim as my invention—

1. The improved process of revivifying or carbonizing filtering or clarifying material which consists in forcing through the same a current of highly superheated steam without otherwise applying heat thereto or to the vessel, and simultaneously stirring the material, whereby the particles are all subjected to the action of the steam, and the revivification is accomplished with uniformity and rapidity, substantially as set forth.

2. The improved process of revivifying or carbonizing filtering or clarifying material which consists in forcing through the same first a current of heated air until it is thoroughly dry, and then a current of highly superheated steam to recarbonize and drive off its contained impurities without in either case applying heat to the exterior of the vessel containing it, substantially as set forth.

3. The improved process of revivifying or carbonizing filtering or clarifying material which consists in first saturating the material with aqueous moisture, then forcing a current of heated air through the same until said moisture is absorbed and carried off, and then forcing a current of highly superheated steam through the same without applying heat to the exterior of the vessel containing the material, substantially as set forth.

4. The process of treating filtering or clarifying material which consists in passing live or prime steam through it, digesting it for a time at a high temperature, drying it by suitable means, and then passing superheated steam through it, substantially as set forth.

5. The improved process of treating filtering or clarifying materials which consists in injecting live or prime steam into it until it is saturated therewith, passing heated air through it until it is dried, and passing superheated steam through it, substantially as set forth.

6. The improved process of treating filtering or clarifying material which consists in injecting live or prime steam into it until it is saturated, passing heated air through it until it is dried, passing superheated steam through it to carbonize it, and finally passing cool or unheated air through it to cool it, substantially as set forth.

7. A filter consisting of a vessel or cylinder, A, and valved inlet and outlet pipes C and D, provided with a tubular shaft, E, having perforated tubular arms e e, and rotatively mounted therein, and with a pipe, H, whose bore communicates with the bore in the shaft, all combined and arranged substantially as set forth.

8. The combination to form a filter of cylinder A, pipes C and D, tubular shaft E, arms e e thereof, and expansible tube P, adapted to enter the bore of the shaft and capable of being inflated therein, substantially as set forth.

9. The carbonizing apparatus consisting of the combination of cylinder A, tubular shaft E, arms e e thereof, pipe H, superheater G, pipe L', and blower M, substantially as set forth.

10. The combination of cylinder A, tubular shaft E, hollow perforated arms e e thereof, pipe H, communicating with said shaft, superheater G, air-jacket K, air-pipes L L', blower M, and cocks in pipes H and L', substantially as set forth.

11. The combination, with a containing-vessel, A, of pipes H and L, cocks in said pipes, superheater G, and blower M, substantially as set forth.

12. The combination of vessel A, pipes H, L, and L', and blower M, with a superheater, G, consisting of a furnace, J, a coil, I, therein, and an air-jacket, K, therearound, substantially as set forth.

In witness whereof I have hereunto signed my name in the presence of two subscribing witnesses.

JOSEPH WM. J. REFORD.

Witnesses:
JOHN H. OCKERSHAUSEN,
ARTHUR C. FRASER.